April 29, 1969 K. G. SJØTUN 3,441,325

DETACHABLE STOP RING FOR A SHAFT

Filed April 18, 1967

United States Patent Office 3,441,325
Patented Apr. 29, 1969

3,441,325
DETACHABLE STOP RING FOR A SHAFT
Kyrre Guttorm Sjøtun, Nordborg, Denmark, assignor to Danfoss A/S, Nordborg, Denmark, a company of Denmark
Filed Apr. 18, 1967, Ser. No. 631,837
Claims priority, application Germany, Apr. 21, 1966, D 49,906
Int. Cl. F16c 17/00, 17/04, 17/10
U.S. Cl. 308—161                       7 Claims

ABSTRACT OF THE DISCLOSURE

Key assembly for use in rotary apparatus keying a shaft longitudinally holding the shaft axially thereby holding a rotor driven by the shaft in axial position. The key assembly comprises a resilient support ring on the shaft cooperative with one or a pair of ring elements removably mounting the shaft and rotor in the apparatus. The ring elements cooperate with axially spaced abutment surfaces that are stationary axially and define the limits of permitted axial movement of the shaft and therefore of the rotor. When engaged with respective abutment surfaces the ring elements bear on the support ring and develop jointly therewith a force having an axial component tending to oppose axial movement of the shaft away from its operating axial position and restore the shaft to its designated operating axial position. The force developed by each of the rings also has a radial component tending to urge the resilient support ring into contact with the shaft and carry out a centering function. The assembly carries out self-centering and self-aligning functions.

---

Figure 1:
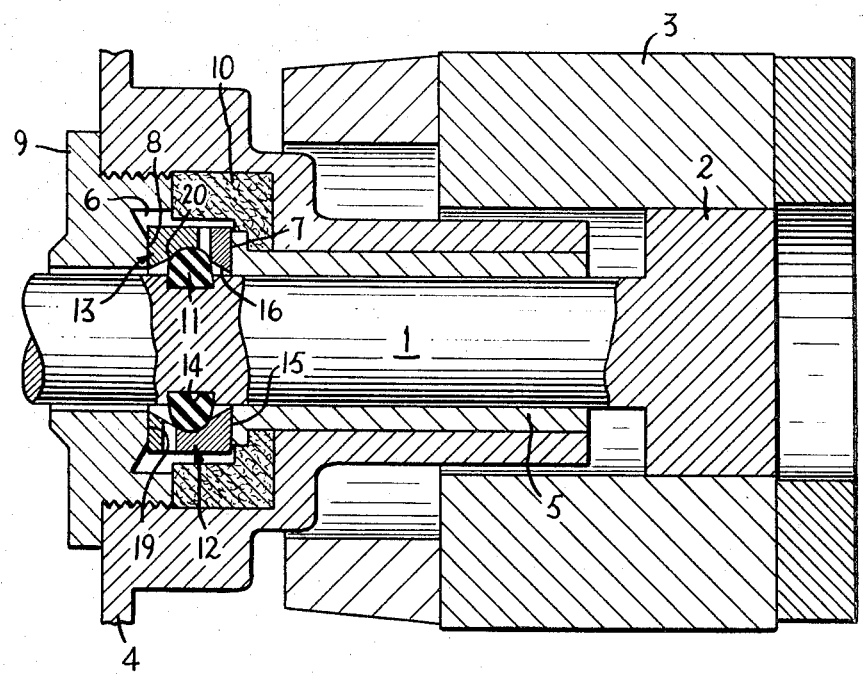

This invention relates generally to rotary apparatus and more particularly to devices for keying a rotor shaft longitudinally in electric motors.

Rotary apparatus having rotatably driven shafts, for example electric motors, have the shaft secured axially by means of a stop mechanism, for example a stop ring. The stop device may be permanently connected to the shaft, for example by shrinking, or made integral with the shaft. Constructions in which a permanent key arrangement is used have an unfortunate limitation in that the rotor must be connected to the shaft in a detachable manner or alternatively if the rotor is fixed to the shaft, for example by shrinking, the motor or rotary apparatus cannot be dismantled. Another disadvantage in the known key techniques or stops is that all of the cooperating surfaces, i.e. the bearing surfaces and stop surfaces of revolving or stationary parts, must be made with great precision and must be symmetrical with respect to the axis of rotation and have parallel sides. When a stop device, such as a stop ring, is shrunk onto the shaft it is imperative that the sides thereof be exactly perpendicular to the shaft axis.

It is a principal object of the present invention to provide a key assembly readily permitting disassembly of the shaft and rotor from a rotary apparatus and capable of carrying out self-centering and self-aligning functions.

A feature of the invention is the provision of a resilient support ring on the shaft whose internal diameter, in a relaxed condition, is at most equal to the shaft diameter of the area in which it is disposed and cooperates with at least one stop ring element which is disposed circumferentially of the support ring and is provided with an internal surface, which is oblique to the longitudinal axis of the shaft, bearing on the support ring to develop self-centering and self-aligning forces, when engaged with axially stationary abutment surfaces, and forces which also hold the shaft in axial position. The abutment surface of the ring element or elements is on a side of the ring effective to cause the ring element to cooperate with the support ring in carrying out the intended functions thereof.

The key assembly is constructed such that the components thereof comprising the support ring and stop ring element or elements can be readily slipped on to the shaft and removed therefrom without major dismantling effort thereby providing an easy construction for dismantling the motor. Nevertheless, the assembly has sufficient stability for absorption of axial forces developed during operation.

The axial forces applied along the shaft are opposed and absorbed with substantial ease since the stop rings are provided with internal surfaces that are oblique relative to the longitudinal axis of the shaft and cooperate with the support ring to generate a component of radial force which presses the resilient support ring firmly onto the shaft surface and automatically carry out a self-centering function. Moreover, the forces developed by the key assembly include an axial component opposing the axial movement of the shaft and tend to restore the shaft to its designated axial operating position. Furthermore, the resilience of the support ring permits substantial universal pivoting of the assembly of stop ring elements to a certain degree so that it is self-aligning with respect to fixed stop or abutment surfaces.

In one embodiment of the invention the support ring is seated in an annular groove which has flat surfaces. The greater the axial stress the more firmly the support ring is pressed into this annular groove so that the ring and shaft are substantially "integral" and the forces developed with this support ring are applied to the shaft. In order that the support ring, in a non-loaded condition of the apparatus, is not able to rotate relatively to the shaft its inner diameter, in a relaxed condition thereof, should be smaller than the diameter of the annular groove in which case friction between the support ring and shaft is generated even when the support ring is not being pressed firmly onto the shaft by the ring assembly components.

The support ring may be made in various cross sectional shapes, however, a commercial O-ring of the type used for sealing purposes may be used. The internal surfaces of the other rings that cooperate with the deformable support ring can be made as several types of surfaces oblique to the axis of the shaft, for example a curved surface of revolution or oblique surfaces delimiting a polygonal recess or as conical surfaces. The latter surface is the easiest to manufacture and provides sufficient accurate operation within operational conditions generally encountered in electric motors. Preferably the internal oblique bearing surface merges with or continues as an arcuate or cylindrical surface of a radius substantially the same as the outer diameter or surface of the support ring. This arcuate surface insures that the resilient support ring cannot yield in an outward direction and the forces developed can be transmitted from the oblique surface and are not allowed to generate a marked radial component.

The key assembly can be made either with one or two key or stop rings. With the use of one ring the axial travel of the shaft can be limited in one direction of movement while the use of two rings results in a double-acting stop ring assembly. In this case the shaft movement can be defined or limited as to its movement in two opposite axial directions. The two stop ring elements bear on the support ring on respective sides thereof and cooperate with respective abutment stop surfaces depending upon the direction of axial loading or tendency of the shaft to move in one of the two directions. One or the other of the stop ring elements will then act upon the support ring to develop the forces above mentioned.

The two ring elements are preferably keyed to one another in a separable manner. The separable construction may be provided by using mating or inter-engaging teeth on the ring elements that keep them jointly rotationally positioned and prevent a non-loaded stop ring element from failing to participate in the rotary movement of the shaft. However, the tooth arrangement should allow play between the teeth which enables the two rings to remain self-aligning and in particular allows their stop surfaces, cooperating with the axially stationary stop surfaces, to align themselves parallel with one another. In such a construction the teeth themselves may be provided with the inner arcuate surface which prevents the yielding, in a loaded condition, of the ring radially or outwardly as before described.

Figure 2:
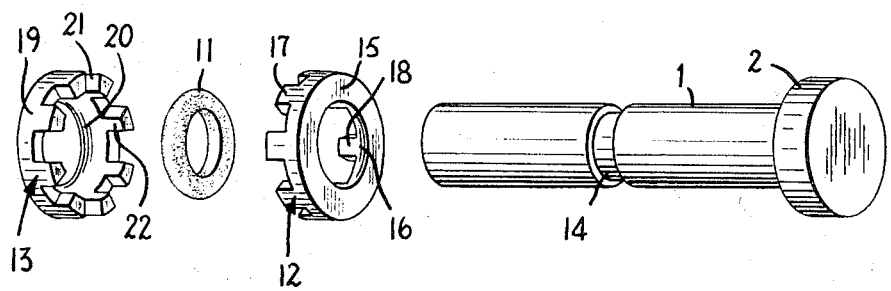

Other features and advantages of the key assembly and electric motor in accordance with the present invention will be better understood as described in the following specification and appended claims in conjunction with the following drawings in which:

FIG. 1 is a fragmentary, longitudinal sectional view of a motor provided with a shaft key assembly in accordance with the invention; and FIG. 2 is an exploded view of the separable key assembly of FIG. 1.

While the invention will be described as particularly applicable to electric motors it will be understood that it is applicable to rotary apparatus in which a shaft is to be removably mounted and keyed axially in position.

As illustrated, fragmentarily in section in FIG. 1, in the drawing a rotatably driven shaft 1 is provided with an enlarged end or head 2 on which is fixed a rotor 3 of an asynchronous motor. The rotor 3 may be shrunk onto the shaft or otherwise fixed or keyed thereon for rotation jointly with the driven shaft 1. A fixed or stationary housing 4 for the motor is illustrated fragmentarily and within this casing is disposed a sleeve bearing 5.

The shaft 1 is provided with a key assembly generally designated as 6 constructed as hereinafter described and disposed between an axially stationary or axially fixed abutment surface 7 on the sleeve 5 and a second axially stationary abutment surface 8, axially spaced from the other abutment surface 7, provided on a threaded thrust or stop bearing 9. The two stop or abutment surfaces 7, 8 define the axial space for the key assembly.

The motor is provided with packing 10 for lubrication of the assembly and admission of a lubricant through access thereto, not shown. It is of course understood that the assembly can be lubricated in known manner by providing a lubricant through the packing. Other constructions, not shown, may have the lubricant semi-permanently provided in known manner. However, the invention is particularly applicable to motors that are not sealed and are capable of being dismantled or stripped down.

The details of the key assembly are illustrated in FIG. 1 and more particularly in FIG. 2. The stop ring or key assembly, as illustrated in FIG. 2, comprises a resilient, deformable ring 11 which in the example illustrated consists of a conventional O-ring. Cooperative with the support ring and disposed circumferentially thereof are disposed two stop ring elements 12, 13 functioning as hereinafter described.

The support ring 11 is disposed or housed in an annular, circumferential groove 14 on the shaft 1. The surfaces defining the circumferential groove are preferably flat when a support ring having a circular cross-section is used. The inner diameter of the support ring is such that in a relaxed condition it generates sufficient frictional engagement with the grooved shaft so as to rotate therewith. The stop ring element 12 is disposed on one side of the support ring and has on a side thereof a stop or bearing surface 15 and an inner oblique bearing surface 16 in the region of teeth 17 provided thereon. The oblique bearing surface 16 merges into a cylindrical or arcuate surface 18 disposed over an arcuate portion of the support ring 11 and having a radius of curvature corresponding to that of the outer surface of the support ring. The stop ring element 13 likewise is on another side of the support ring and has an abutment or bearing surface 19 and an internal surface oblique relative to the axis of the shaft which merges smoothly, in the region of a plurality of teeth 21, with a cylindrical or arcuate surface 22 disposed circumferentially of an arcuate portion of the support ring 11 as illustrated in FIG. 1. The arcuate or cylindrical surface 22 has a radius of curvature corresponding to the radius of curvature of the outer surfaces of the support ring 11. Moreover, the teeth 17, 21 of the ring elements are dimensioned in such a way that they engage with sufficient play, for reasons later described and allow a separable joint assembly of the two ring elements while joining them so that they both jointly rotate with the support ring 11 rotatably driven in conjunction with the shaft 1.

As illustrated in FIG. 1 the two stop ring elements 12, 13 bear on the ring 11 with the conical or oblique surfaces thereof if there is any tendency of the shaft 1 to move longitudinally carrying the support ring therewith and causing the ring element stop surfaces to bear on the axially fixed stop surfaces 7, 8. The arcuate or cylindrical surfaces 18, 22 prevent yield of the deformable ring 11 in an outward direction when the inner oblique surfaces bear thereon. If a force acting in an axial direction toward the left as illustrated in the drawing is applied to the shaft the stop surface 16 of the ring element 13 bears on the abutment or stop surface 8 of the threaded nut 9. The conical oblique surface 20 of the ring element develops jointly with the support ring a force transmitted to the support ring 11 having a radial component so that the ring 11 is firmly biased or pressed into the groove 14. At the same time an axial component is developed and axial movement of the shaft is prevented and the shaft tends to be restored to its operating axial position.

Similarly if the shaft tends to move toward the right an axial corrective force is applied to the shaft by the stop ring 12 by bearing against the abutment surface 7 of the bearing 5. The internal oblique surface 16 bears on the support ring and transmits a force to the ring 11 stopping axial movement and including a radial component acting on the ring as heretofore described. The play between the teeth will allow the stop surfaces 15, 19 to self-align themselves parallel with one another and correctly engage the stationary abutment surfaces, 7, 8. It being understood that in the case illustrated the four abutment surfaces, 7, 8 and 18, 19, are perpendicular to the longitudinal axis of the shaft.

The assembly permits easy assembly or disassembly of the rotor and shaft in the motor. In assemblying the apparatus the shaft is inserted, with the rotor thereon, axially into the bearing 5 from the right. It being understood that the bearing 9 is not in position. The ring element 12 is placed on the shaft then the resilient support ring 11 is subsequently fitted onto the shaft and engages the groove 14 after which the stop ring element 13 is added. Thereafter the threaded nut is screwed into position until the stop ring assembly is held with sufficient clearance or play for operation.

In order to enable the stop ring element 12 to be separated from the support ring 11 without difficulty the head 2 is kept slightly apart from the bearing 5 in an operational position so that a slight axial extension of the shaft 1 to the left becomes possible after the threaded nut 9 has been removed.

In one embodiment of the invention the O-ring 11 has a Shore hardness of about 70. In a relaxed condition it has an inner diameter of about six (6) millimeters and a width of about four (4) millimeters. The annular groove has a width of four (4) millimeters and a depth of 1.2 mm. and a diameter of 9.6 mm.

Those skilled in the art will recognize that the support ring 11 need not have an O-ring shape as illustrated. Support rings of different cross sections may be used, for example of a triangular or trapezoidal cross section.

While a preferred embodiment of the invention has been shown and described it will be understood that many modifications and changes can be made within the true spirit and scope of the invention.

What I claim and desire to be secured by Letters Patent is:

1. In an electric motor having a rotor, a shaft fixed to said rotor driven rotatably in operation pivotally and rotatably mounting said rotor, means mounting said shaft for rotation theron and having abutment surfaces, the improvement which comprises a stop assembly removably fixing said shaft and rotor axially on said means mounting said shaft for rotation comprising, a deformable support ring circumferentially of said shaft and movable at least axially with said shaft, a ring element disposed circumferentially of said support ring having a surface engaged with a respective abutment surface of said means mounting said shaft for rotation when said shaft tends to move axially in either of two opposite axial directions away from a given axial position, said ring having a surface developing when abutting the respective abutment surface and jointly with said support ring a force having an axial component tending to oppose axial movement of said shaft in a respective one of said opposite axial directions and restoring said shaft to said given axial position and a radial component urging said support ring circumferentially into contact with said shaft.

2. In an electric motor having a rotor, a shaft fixed to said rotor driven rotatably in operation pivotally and rotatably mounting said rotor, means mounting said shaft for rotation thereon and having abutment surfaces, the improvement which comprises a stop assembly removably fixing said shaft and rotor axially on said means mounting said shaft for rotation comprising, a support ring consisting of a resilient deformable ring circumferentially of said shaft and movable axially with said shaft, a separable ring assembly comprising a pair of ring elements disposed circumferentially of said support ring each having a surface engaged with a respective abutment surface of said means mounting said shaft for rotation when said shaft tends to move axially in either of two opposite axial directions away from a given axial position, and each having a surface developing when abutting the respective abutment surface and jointly with said support ring a force having an axial component tending to oppose axial movement of said shaft in a respective one of said opposite axial directions and restoring said shaft to said given axial position and a radial component urging said support ring circumferentially into contact with said shaft.

3. In an electric motor according to claim 2, in which said pair of ring elements are disposed axially between axially spaced abutment surfaces of said means mounting said shaft for rotation, said pair of ring elements comprising mating teeth and recesses extending in a direction corresponding to an axial direction of said shaft separably joining said ring elements for joint rotation.

4. In an electric motor according to claim 2, in which said support ring comprises an O-ring and in which said shaft comprises a circumferential groove, said O-ring being disposed in said groove and extending radially of said shaft outwardly of said groove.

5. In an electric motor according to claim 2, in which said means mounting said shaft for rotation comprises a pair of bearings spaced axially and circumferentially of said shaft and in which said bearings each comprise one of said abutment surfaces, each of said abutment surfaces extending radially of said shaft, and said surface of each of said ring elements comprising an abutment surface radially of said shaft and engageable with a corresponding abutment surface of a respective bearing against which it bears when said shaft tends to move axially.

6. In an electric motor according to claim 2, in which each surface of said ring element developing said force comprising force components comprises an internal surface oblique relative to the longitudinal axis of said shaft bearing on said support ring effective to develop said force and the components thereof, each of said ring elements comprising an internal annular surface corresponding in cross section with a peripheral portion of said support ring on which it is supported, and said annular surface merging with the oblique surface of a respective ring element.

7. In a rotary apparatus having a rotor, a shaft fixed to said rotor driven rotatably in operation for rotation of said rotor, means defining abutment surfaces axially spaced relative to said shaft, the improvement which comprises a key assembly keying said shaft longitudinally holding said shaft axially comprising, a resilient support ring circumferentially of said shaft and movable axially and rotationally with said shaft, a separable ring assembly comprising a pair of ring elements disposed circumferentially of said support ring each having a surface engaged with a respective one of the abutment surfaces disposed axially spaced relative to said shaft when said shaft tends to move axially in either of two opposite axial directions and each having an internal surface developing when abutting the respective abutment surface and jointly with said support ring a force having an axial component opposing axial movement of said shaft in a respective one of said opposite directions.

References Cited

UNITED STATES PATENTS

| | | | |
|---|---|---|---|
| 1,476,345 | 12/1923 | McGee | 308—161 |
| 2,483,013 | 9/1949 | Kopprasch | 310—90 |
| 2,873,152 | 2/1959 | Thompson | 308—135 X |

FOREIGN PATENTS

| | | |
|---|---|---|
| 915,604 | 7/1946 | France. |
| 405,374 | 10/1924 | Germany. |

CARROLL B. DORITY, JR., *Primary Examiner.*

U.S. Cl. X.R.

308—135, 140; 310—90